G. A. PRENTISS.
Car Axle.
No. 18,248.
2 Sheets—Sheet 1.
Patented Sept. 22, 1857.
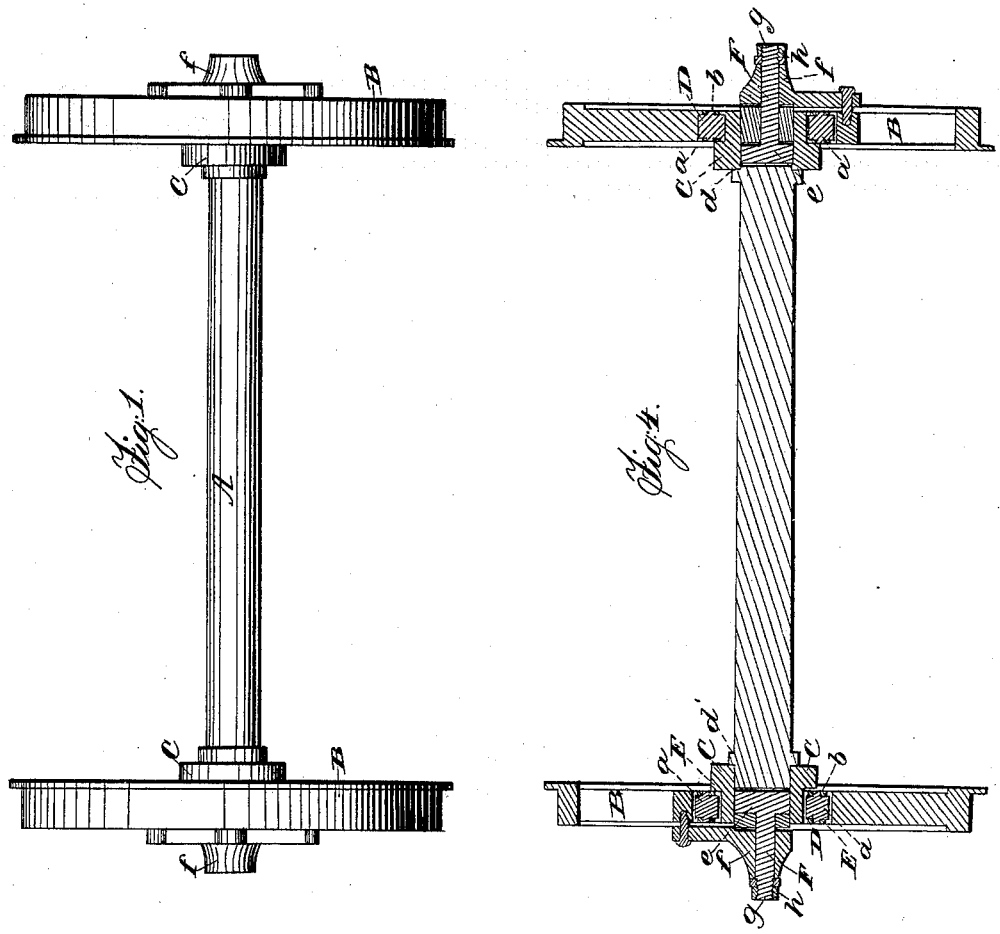

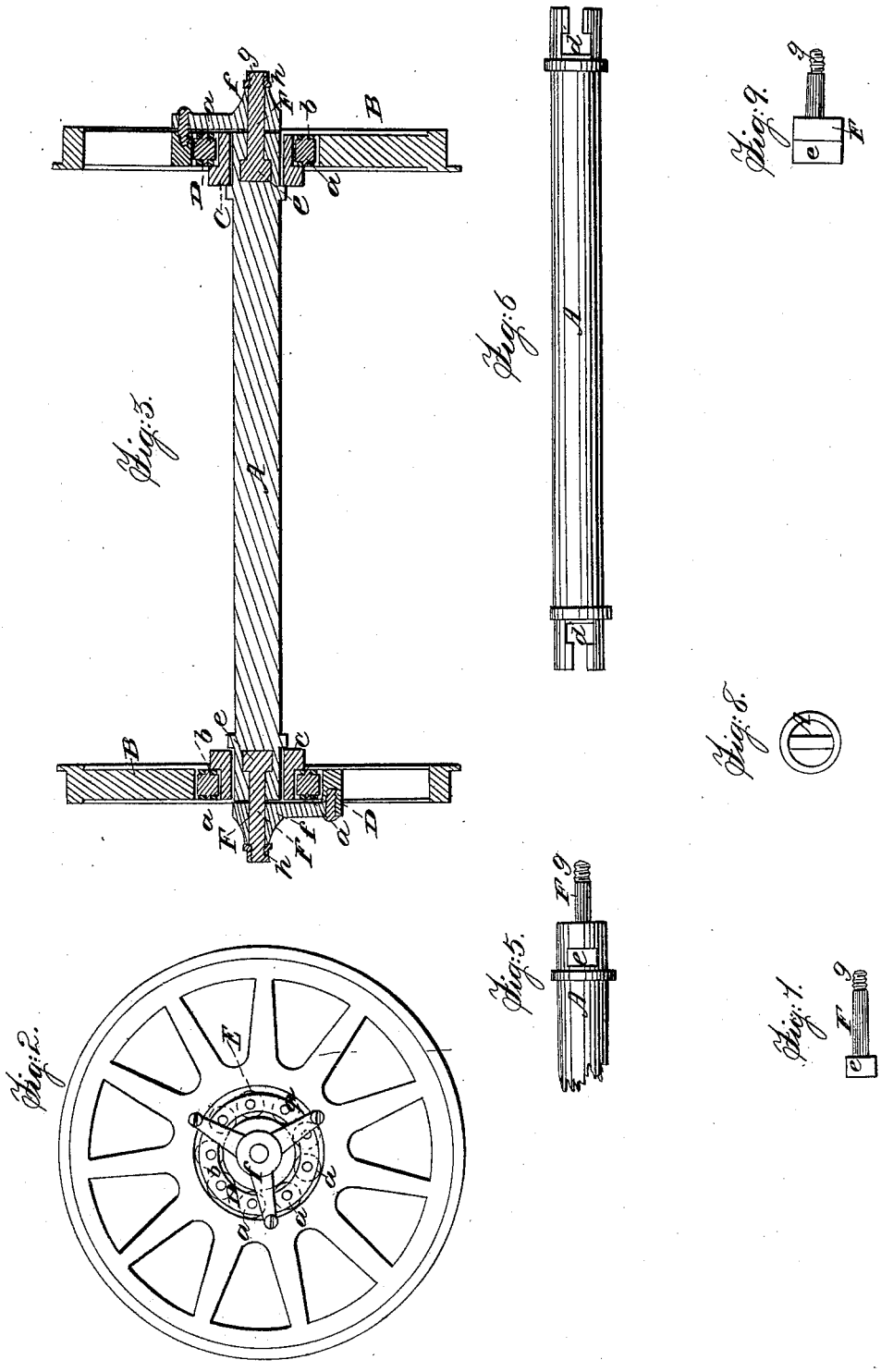
G. A. PRENTISS.
Car Axle.
No. 18,248.
2 Sheets—Sheet 2.
Patented Sept. 22, 1857.

UNITED STATES PATENT OFFICE.

GEORGE A. PRENTISS, OF CAMBRIDGE, MASSACHUSETTS.

JOURNAL OF AXLES WITH FRICTION-ROLLERS.

Specification of Letters Patent No. 18,248, dated September 22, 1857.

*To all whom it may concern:*

Be it known that I, GEORGE A. PRENTISS, at present residing in Cambridge, in the county of Middlesex and State of Massachusetts, have invented a new and useful Improvement in Wheel-Axles Operating with Friction-Rollers; and I do hereby declare that the same is fully described and represented in the following specification and the accompanying drawings, of which—

Figure 1, exhibits a top view of a railway carriage axle and a pair of wheels provided with my improvement. Fig. 2, an end elevation of the same. Fig. 3, a horizontal and axial section of them. Fig. 4, a vertical and axial section of the same. Fig. 5, a top view of one end of the solid axle and its separate securing journal. Figs. 6 and 7, are top views of the axle and securing journal when apart from one another. Fig. 8, is an end view of the axle, while Fig. 9, is a side view of the securing journal.

My present invention differs from that for which Letters Patent (No. 12,572) were granted to me on the 21st day of March A. D. 1855. In the latter, a tubular axle was an essential feature, but in the former I employ a solid axle or one made without any bore extending through it. A securing axle or rod extending through the hollow axle was also an essential feature of my original invention, such however in my present improvement is entirely dispensed with and therefore I do not herein claim a tubular load axle provided with bearers and friction rollers, and having a securing axle extending through it concentrically or nearly so, as represented in my said patent.

The nature of my present invention consists in an addition to the common solid axle and friction rollers within the wheel consisting of a separate securing journal or steady pin moving vertically so as to enable the bearing surfaces to run in contact whatever may be the amount of wear.

In the drawings A, is a solid axle; B, B, the wheels thereof; C, C, the bearers or bearing rings of the axle; D, D, the sets of friction rollers, and E, E, the cylindrical recesses or chambers for reception of the sets of friction rollers, the said recesses being formed within the wheels as shown in the drawings. The several friction rollers, $a$, $a$, of each set are arranged and supported within an annular frame, $b$, and while in operation they work or roll against the concentric surfaces of the bearers, C, and the cylindrical recesses, E, E. Each end of the axle or part on which is a bearer, C, is furnished with a dovetailed recess, $d'$, made vertically through it and for the reception of a corresponding dovetail, $e$, formed on a separate securing journal, F, the same being so as to enable the said securing journal to play freely in a vertical direction in the solid axle. This journal extends through the hub part, $f$, of the wheel, and has a screw, $g$, cut upon it for the reception of a nut, $h$, arranged so as to project beyond the hub and retain it on the journal.

The wheels revolve on their journals, while the axle is stationary.

From the above, it will be seen readily that in case of wear of the concentric bearing surfaces or of the friction rollers, they will always remain in contact, the secondary journal moving vertically with the wheel in accordance with such wear. Were the journal immovable with respect to the axle, the wear of the friction rollers and their bearing surfaces, would tend to remove the strain of the load from them to the securing journals and soon prevent the proper operation of the friction rollers, but, by having the securing journals applied to the axle in such manner as to be capable of moving upward therein as described, the strain of the load will always be borne by the friction rollers, the bearer and the inner curved periphery of the inclosing chamber.

I claim as my invention—

The above-described securing journals, applied to the solid axle and friction rollers.

In testimony whereof, I have hereunto set my signature, this 18th day of May, 1857.

GEO. A. PRENTISS.

Witnesses:
R. H. EDDY,
F. P. HALE, Jr.